US012394930B2

(12) United States Patent
Ding et al.

(10) Patent No.: US 12,394,930 B2
(45) Date of Patent: Aug. 19, 2025

(54) SOCKET MODULE

(71) Applicant: Dongguan Keben Electrical Appliance Co., Ltd., Dongguan (CN)

(72) Inventors: Sheng Ding, Dongguan (CN); Li Qin Ye, Dongguan (CN); Yuan Cui, Dongguan (CN)

(73) Assignee: Dongguan Keben Electrical Appliance Co., Ltd., Dongguan (CN)

( * ) Notice: Subject to any disclaimer, the term of this patent is extended or adjusted under 35 U.S.C. 154(b) by 333 days.

(21) Appl. No.: 18/328,415

(22) Filed: Jun. 2, 2023

(65) Prior Publication Data

US 2024/0405468 A1 Dec. 5, 2024

(51) Int. Cl.

| | |
|---|---|
| ***H01R 13/42*** | (2006.01) |
| ***H01R 24/30*** | (2011.01) |
| ***H01R 25/00*** | (2006.01) |
| ***H01R 103/00*** | (2006.01) |

(52) U.S. Cl.

CPC ............. *H01R 13/42* (2013.01); *H01R 24/30* (2013.01); *H01R 25/003* (2013.01); *H01R 2103/00* (2013.01)

(58) Field of Classification Search

CPC ...... H01R 13/42; H01R 24/30; H01R 25/003; H01R 2103/00; H01R 13/4361; H01R 13/4367; H01R 13/11; H01R 13/112; H01R 13/506; H01R 11/09

See application file for complete search history.

(56) References Cited

U.S. PATENT DOCUMENTS 5,320,545 A * 6/1994 Brothers ............ H01R 13/7036 200/51.09
7,070,432 B1 * 7/2006 Lin .................... H01R 13/7032 200/51.09
10,243,296 B2 * 3/2019 Cheng .................... H01R 13/18

* cited by examiner

*Primary Examiner* — Briggitte R. Hammond

(57) ABSTRACT

A socket module includes a positioning seat, a live wire conductive sheet, a neutral wire conductive sheet, a ground wire conductive sheet, and a fixing seat. The live wire conductive sheet, the neutral line conductive sheet, and the ground wire conductive sheet are installed on the positioning seat and then assembled into the fixing seat to form an integrated socket module. The socket module has a live wire slot hole corresponding the live wire conductive sheet, a neutral wire slot hole corresponding to the neutral wire conductive sheet, and a ground wire slot hole corresponding to the ground wire conductive sheet in three different directions. The socket module can be installed in single or multiple socket housings to realize a small-sized multi-slot socket that is compact, safe and reliable.

8 Claims, 10 Drawing Sheets

SOCKET MODULE

BACKGROUND OF THE INVENTION

1. Field of the Invention

The present invention relates generally to a socket module for electrical appliances, and more particularly, to a small, simple and compact socket module integrated formed with a plurality of socket slots facing different directions.

2. The Prior Arts

The known extension cord socket structure is to dispose at least one live wire conductive sheet, neutral wire conductive sheet, and ground wire conductive sheet in the socket housing, and at least one live wire slot, neutral wire slot, and ground wire slot on one side of the wall of the socket housing. Thereby, the live wire plate, neutral wire plate, and ground wire plate of a plug can be respectively connected to the live wire conductive sheet, neutral wire conductive sheet, and ground wire conductive sheet through the live wire slot, neutral wire slot, and ground wire slot at the same time to conduct electricity. In most cases, a plurality of live wire slots, neutral wire slots and ground wire slots are provided on one side of the housing wall of the known extension socket housing, and a plurality of live wire conductive sheets, neutral wire conductive sheets, and ground wire conductive sheets are correspondingly arranged inside the socket housing. As such, the more the number of the conductive sheets and slots, the larger the volume of the socket housing.

In order to reduce the volume of the socket housing, some known sockets are provided with a plurality of live wire slots, neutral wire slots and ground wire slots on a plurality of walls of the socket housing, and correspondingly dispose a plurality of live wire conductive sheets, neutral wire conductive sheets and ground wire conductive sheets facing different directions inside of the socket housing wall, so that the live wire socket of the live wire conductive sheet, the neutral wire socket of the neutral wire conductive sheet, and the ground wire socket of the ground wire conductive sheet correspond to the live wire slot, the neutral wire slot, and the ground wire slot on the housing wall of the corresponding direction.

In other words, when the wall of the socket housing has a set of live wire slot, neutral wire slot, and ground wire slot, a set of live wire conductive sheet, neutral wire conductive sheet, and ground wire conductive sheet must be correspondingly arranged inside the socket housing wall. When there are three sets of live wire slot, neutral wire slot, and ground wire slot on the wall of the socket housing, three sets of live wire conductive sheet, neutral wire conductive sheet, and ground wire conductive sheet must be provided correspondingly inside the socket housing wall, and so on. Therefore, the socket with more slots will have more conductive sheets inside the socket, and each conductive sheet needs to be connected with a wire for conducting current, resulting in a complex structure, cumbersome manufacturing and assembly, and low safety in use.

SUMMARY OF THE INVENTION

A primary objective of the present invention is to provide a small volume, concise and simple socket module, especially a socket module with a plurality of slots facing different directions, and a small number of conductive sheets and a small number of wires.

The socket module provided by the present invention includes: a positioning seat, having a first positioning part and a second positioning part respectively located at symmetrical positions, and a third positioning part located between the first positioning part and the second positioning part; a live wire conductive sheet, arranged on the first positioning part, and the live wire conductive sheet having a first live wire extension part, a second live wire extension part, and a third live wire extension part respectively extending a length, wherein the first live wire extension part and the second live wire extending part extending towards opposite direction and parallel to each other, the third live wire extending part extending perpendicularly and connected to the first live wire extending part and the second live wire extending part, and a first live wire mouth, a second live wire mouth, and a third live wire mouth being respectively formed at the ends of the first live wire extension part, the second live wire extension part, and the third live wire extension part; a neutral wire conductive sheet, arranged on the second positioning part, the neutral wire conductive sheet having a first neutral wire extension part, a second neutral wire extension part, and a third neutral wire extension part respectively extending a length, wherein the first neutral wire extension part and the second neutral wire extension part extending towards directions opposite and parallel to each other, the third neutral wire extension part extending perpendicularly and connected to the first neutral wire extension part and the second neutral wire extension part, and a first neutral wire mouth, a second neutral wire mouth, and the third neutral wire mouth being respectively formed at the ends of the first neutral wire extending part, the second neutral wire extension part, and the third neutral wire extension part; a ground wire conductive sheet, arranged on the third positioning part, the ground wire conductive sheet having a first ground wire extension part, a second ground wire extension part, and a third ground wire extension part respectively extending a length, wherein the first ground wire extension part and the second ground wire extension part extending towards directions opposite and parallel to each other, the third ground wire extension extending perpendicularly and connected to the first ground wire extension part and the second ground wire extension part, and a first ground wire mouth, a second ground wire mouth, and a third ground wire mouth being respectively formed at the ends of the first ground wire extension part, the second ground wire extension part, and the third ground wire extension part; and a fixing seat for accommodating the positioning seat, the live wire conductive sheet, the neutral wire conductive sheet, and the ground wire conductive sheet, and having a first wall, a second wall, and a third wall, wherein the first wall having a first live wire slot hole corresponding to the first live wire mouth, a first neutral wire slot hole corresponding to the first neutral wire mouth, and a first ground wire slot hole corresponding to the first ground wire mouth, the second wall having a second live wire slot hole corresponding to the second live wire mouth, a second neutral wire slot hole corresponding to the second neutral wire mouth, and a second ground wire slot hole corresponding to the second ground wire mouth, the third wall having a third live wire slot hole corresponding to the third live wire mouth, a third neutral wire slot hole corresponding to the third neutral wire mouth, and a third ground wire slot hole corresponding to the third ground wire mouth.

In a preferred embodiment of the present invention, the first wall and the third wall are parallel to each other, the second wall is adjacent to the first wall and the third wall, and is perpendicular to the first wall and the third wall.

In a preferred embodiment of the present invention, the structure of the live wire conductive sheet and the neutral wire conductive sheet are the same.

In a preferred embodiment of the present invention, the first live wire mouth, the second live wire mouth, the third live wire mouth, the first neutral wire mouth, the second neutral wire mouth, and the third neutral wire mouth are trumpet-shaped openings respectively formed by bending the opposite sides thereof.

In a preferred embodiment of the present invention, the first ground wire mouth, the second ground wire mouth, and the third ground wire mouth are openings formed by bending to form mutually symmetrical S shapes on the opposite sides thereof.

In a preferred embodiment of the present invention, the socket module further comprises: a socket housing having a first housing wall, a second housing wall, and a third housing wall, the first housing wall having a first live wire slot, a first neutral wire slot, and a first ground wire slot, the second wall having a second live wire slot, a second neutral wire slot, and a second ground wire slot, the third wall having a third live wire slot, a second neutral wire slot, and a third ground wire slot, wherein, when the positioning seat being assembled in the fixing seat, the first live wire slot hole, the first neutral wire slot hole, and the first ground wire slot hole being respectively corresponding to the first live wire slot, the first neutral wire slot, and the first ground wire slot, the second live wire slot hole, the second neutral wire slot hole, and the second ground wire slot hole being respectively corresponding to the second live wire slot, the second neutral wire slot, and the second ground wire slot, and the third live wire slot hole, the third neutral wire slot hole, and the third ground wire slot hole being respectively corresponding to the third live wire slot, the third neutral wire slot, and the third ground wire slot.

In a preferred embodiment of the present invention, the socket module may be a plurality, and the first housing wall has a plurality of the first live wire slots, the first neutral wire slots, and the first ground wire slots, the second housing wall has a plurality of the second live wire slots, the second neutral wire slots, and the second ground wire slots, and the third housing wall has a plurality of the third live wire slots, the third neutral wire slots, and the third ground wire slots.

In a preferred embodiment of the present invention, the first live wire extension part, the second live wire extension part, and the third live wire extension part are integrally formed to form the live wire conductive sheet, the first neutral wire extension par, the second neutral wire extension part, and the third neutral wire extension part are integrally formed to form the neutral wire conductive sheet, and the first ground wire extension part, the second ground wire extension part, and the third ground wire extension part are integrally formed to form the ground conductive sheet.

The aforementioned socket module of the present invention, through an integrated design, only needs to connect the live wire conductive sheet, the neutral wire conductive sheet, and the ground wire conductive sheet to complete the electrical connection, so the manufacturing and assembly are relatively easy, safe and reliable. After assembling with the socket housing, a large number of slots can be obtained on a small-sized socket module in a compact shape. Moreover, the design can provide different numbers and functions of slots according to the needs of different home environments, and can meet the different needs of consumers.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
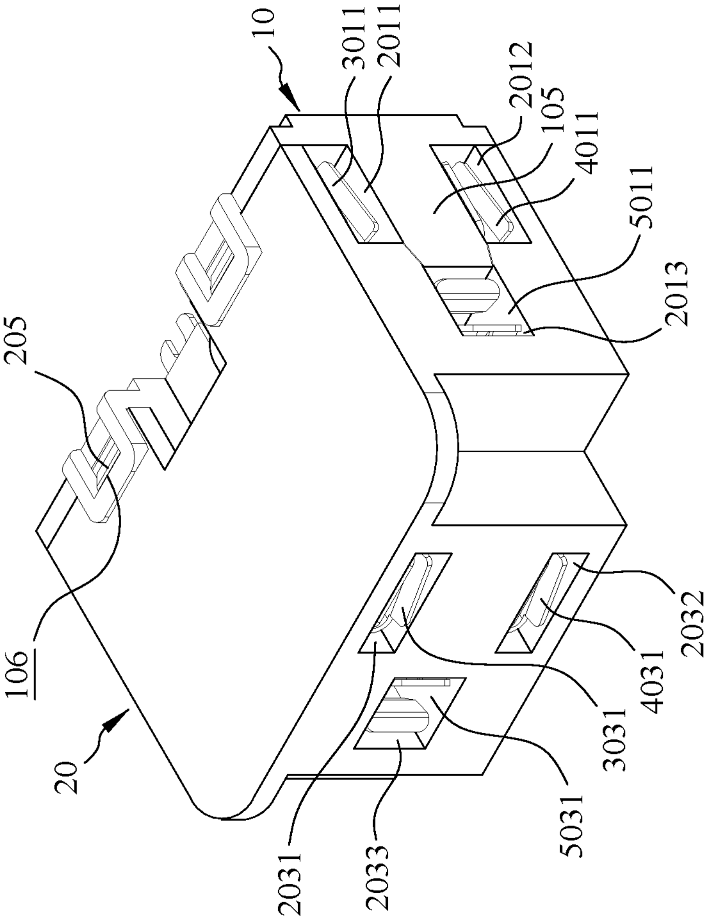
FIG. 1 is a perspective view showing the appearance structure of the socket module of the present invention.

The accompanying drawings are included to provide a further understanding of the invention, and are incorporated in and constitute a part of this specification. The drawings illustrate embodiments of the invention and, together with the description, serve to explain the principles of the invention.

As shown in FIGS. 1-4, the socket module of the present invention includes: a positioning seat 10, a fixing seat 20, a live wire conductive sheet 30, a neutral wire conductive sheet 40, and a ground wire conductive sheet 50. The socket module formed by these component sets has slots facing three directions for inserting the plug, so that the overall structure of the socket module is compact and simple.

Figure 3:
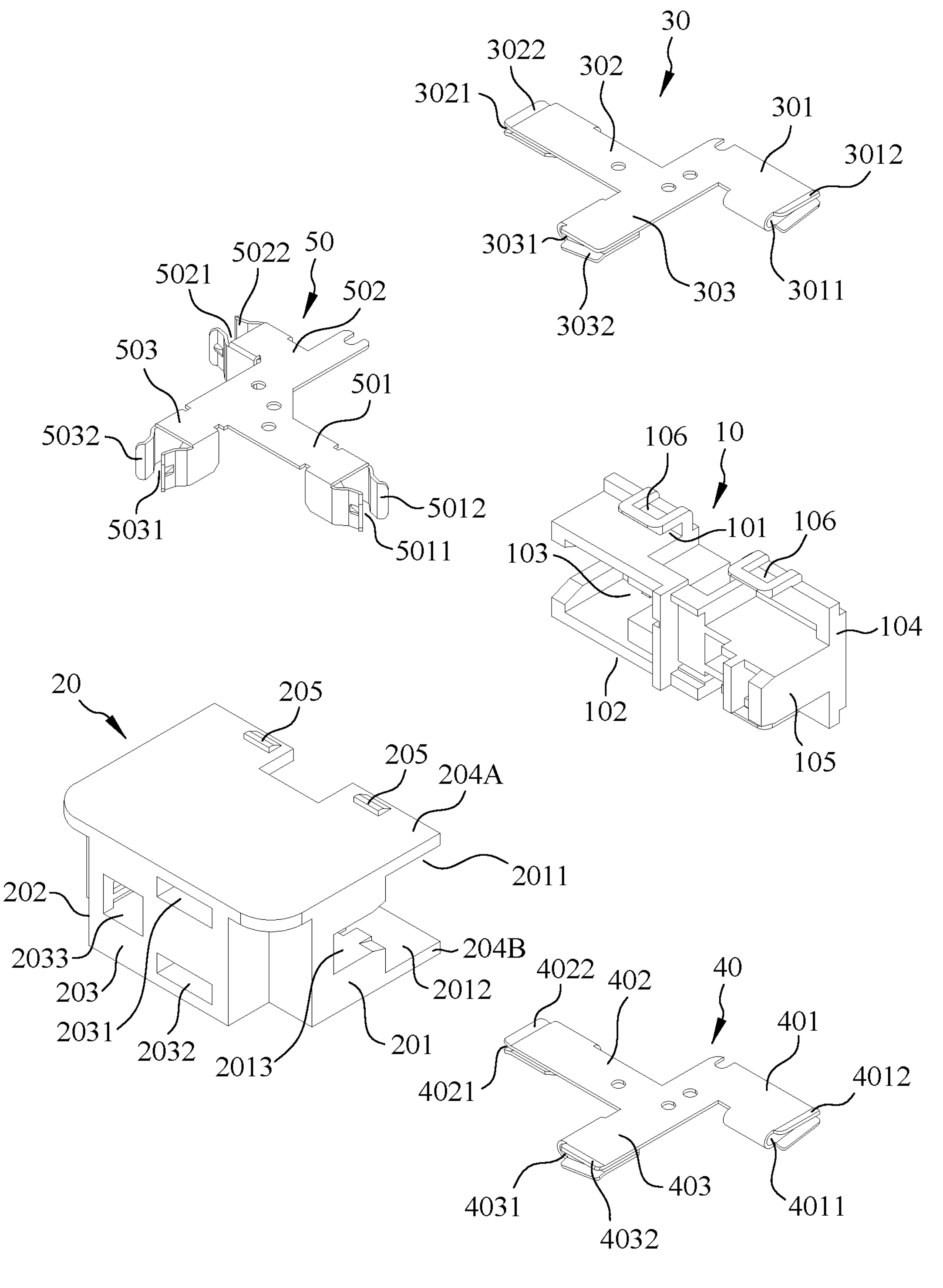
FIG. 3 is an exploded view showing the assembly relationship of the main components of the socket module of the present invention.
Figure 4:
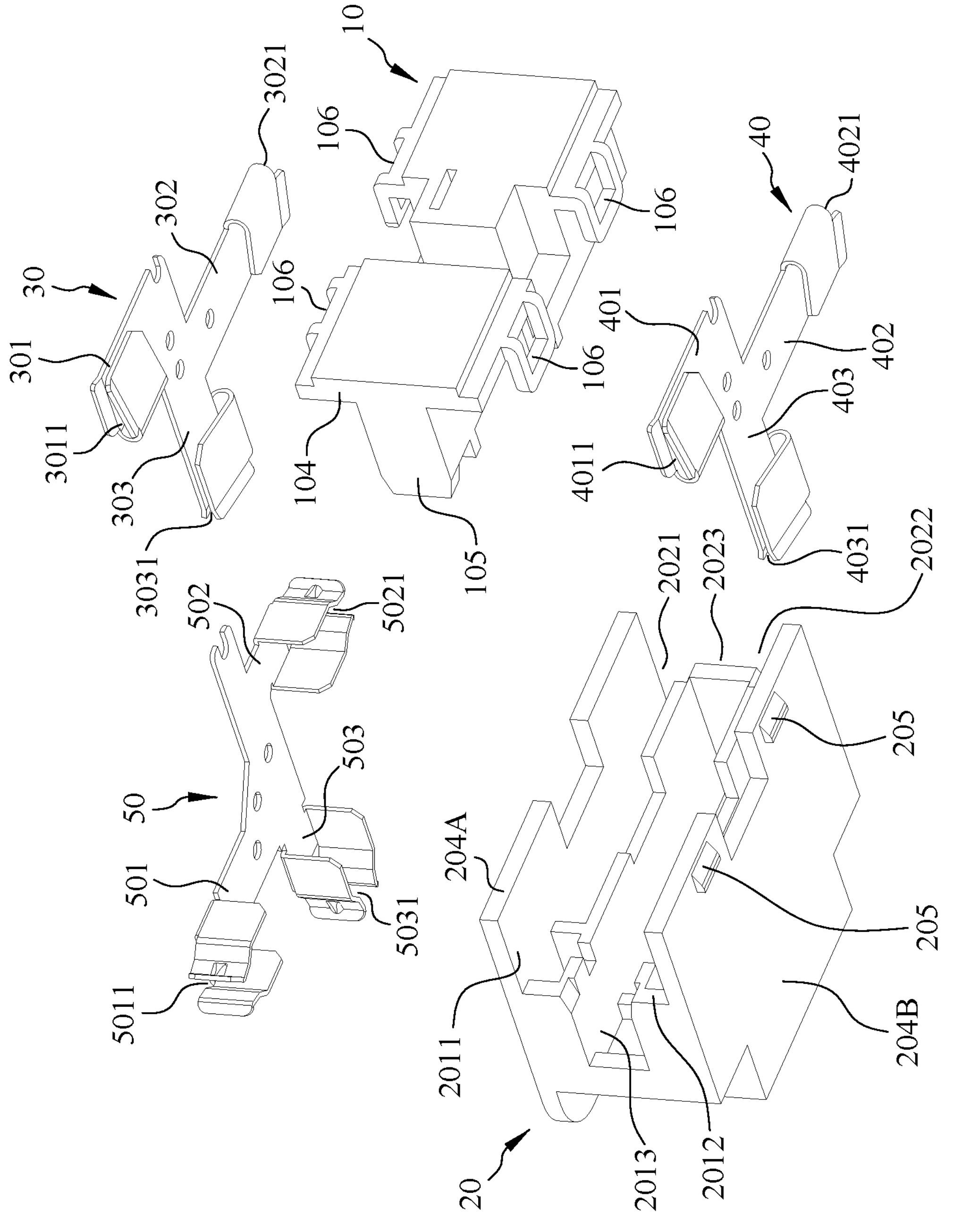
FIG. 4 is an exploded view showing the assembly relationship of the main components of the socket module of the present invention from another angle.
Figure 5:
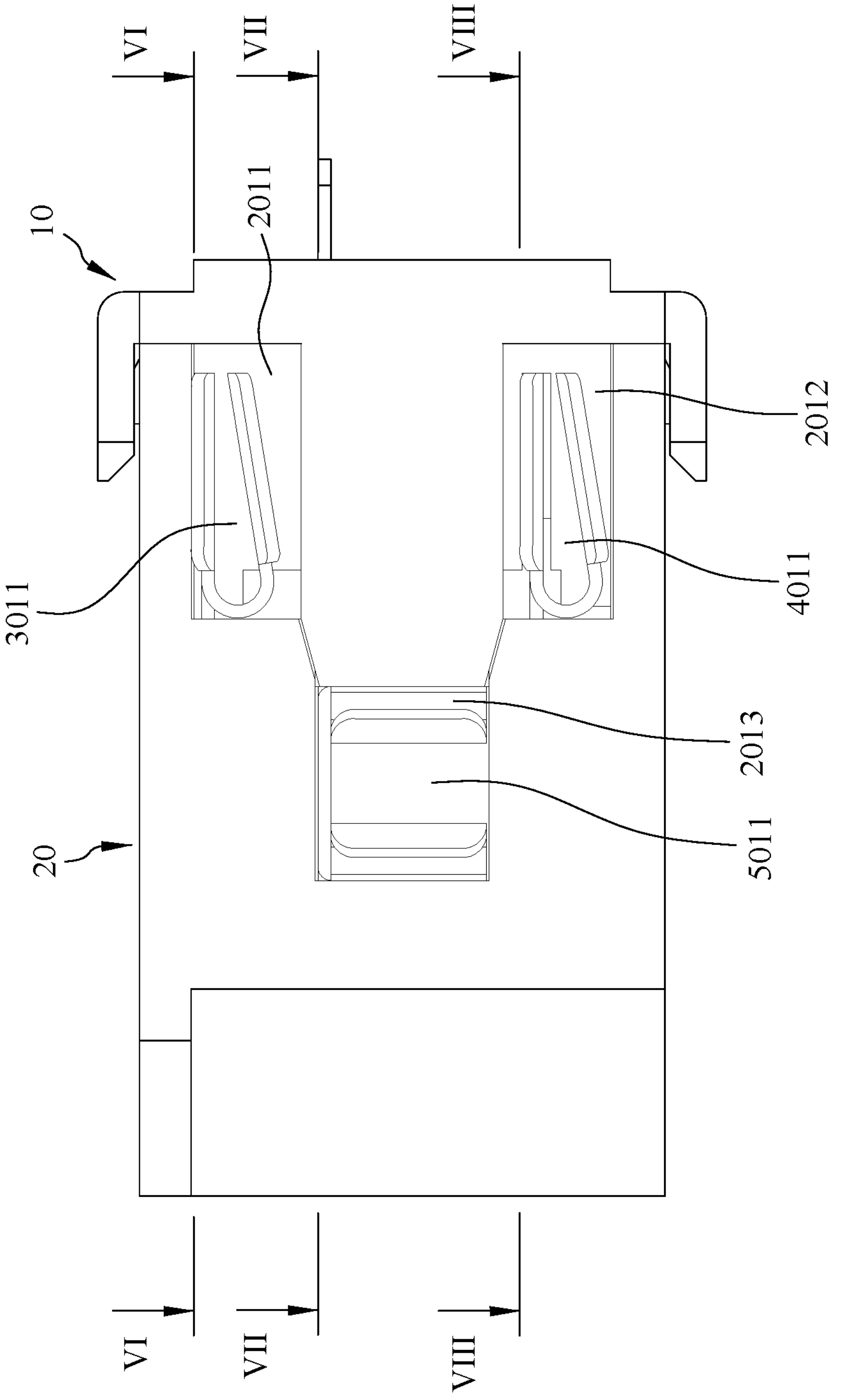
FIG. 5 is a side plan view of the socket module of the present invention.
Figure 6:
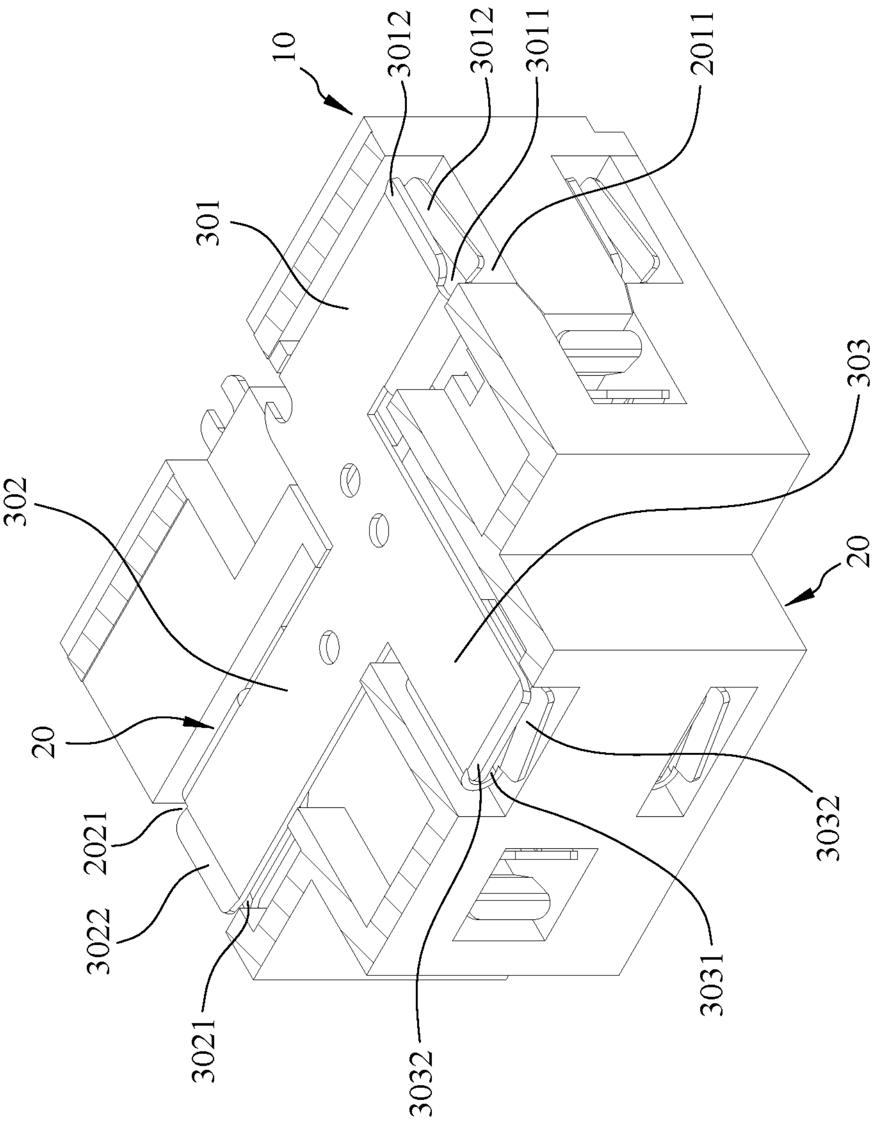
FIG. 6 is a cross-sectional view along the line VI-VI in FIG. 5.
Figure 7:
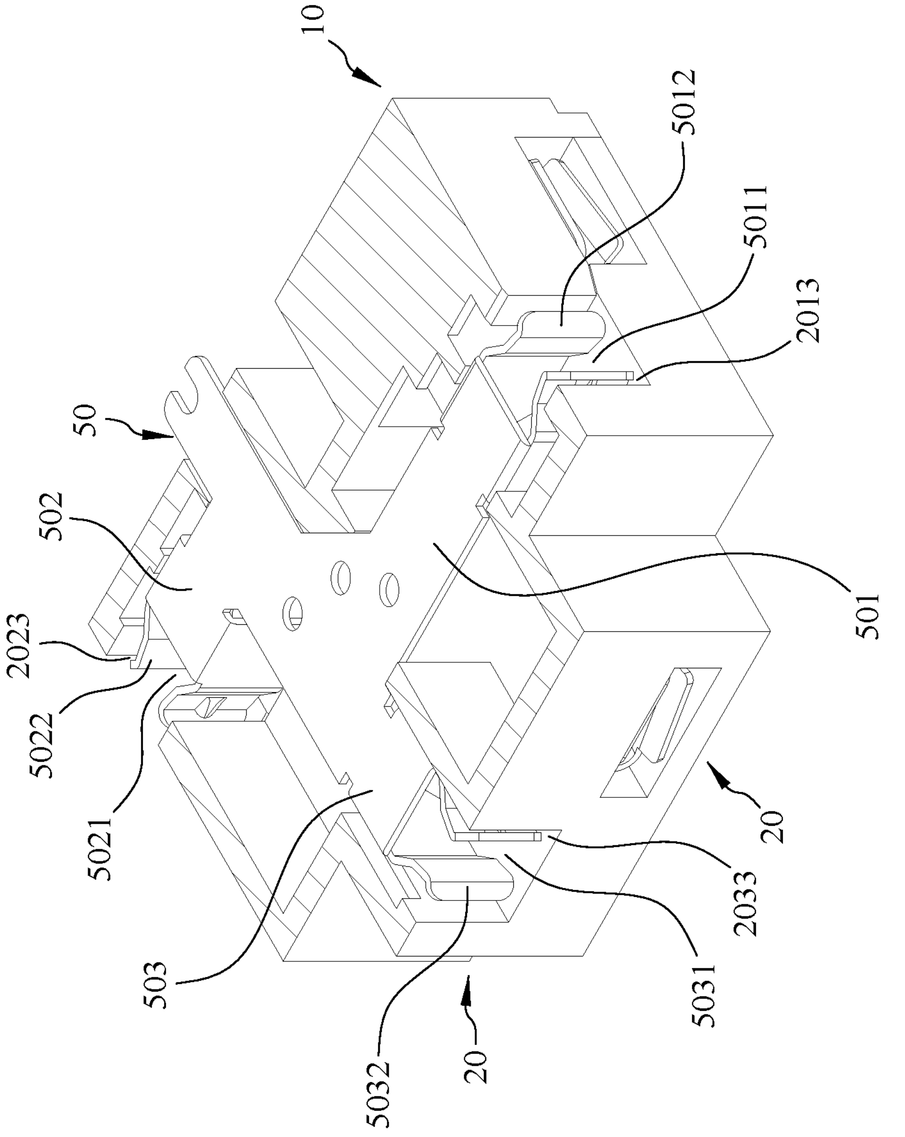
FIG. 7 is a cross-sectional view along the line VII-VII in FIG. 5.
Figure 8:
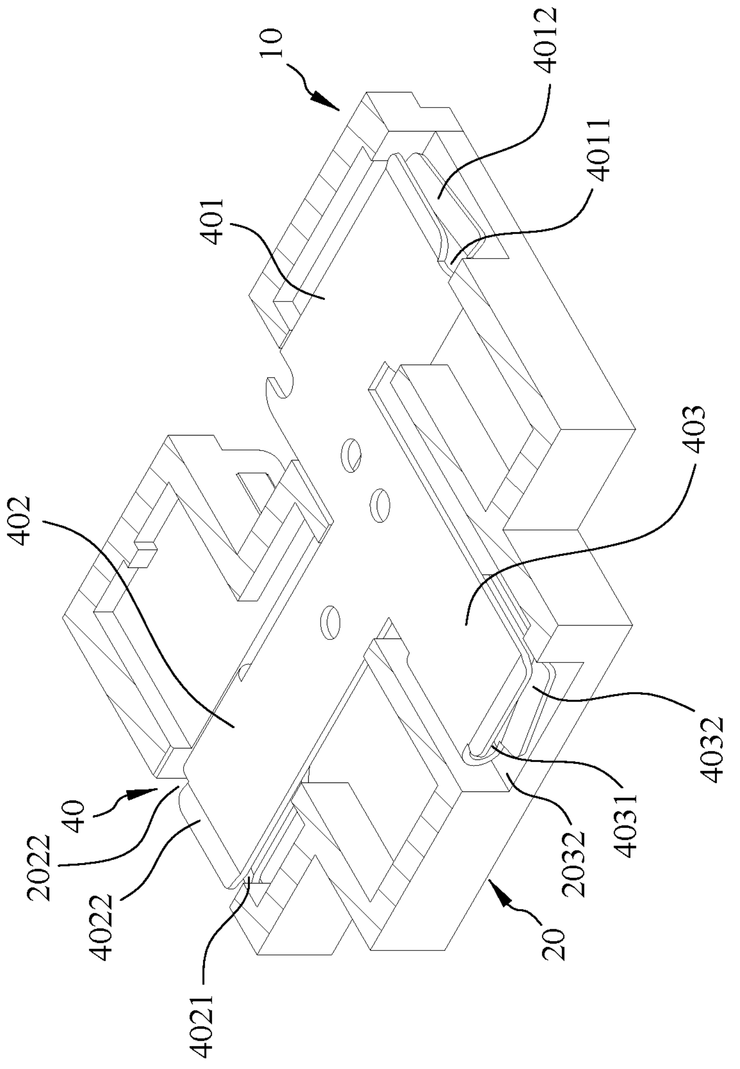
FIG. 8 is a cross-sectional view along the line VIII-VIII in FIG. 5.

As shown in FIG. 3, the positioning seat 10 has a first positioning part 101 and a second positioning part 102 respectively located at upper and lower symmetrical positions, and a third positioning part 103 located between the first positioning part 101 and the second positioning part 102. Specifically, the positioning seat 10 is a seat body formed integrally with insulating plastic materials; for example, a block body 105 is integrally formed on one side of a substrate 104, and the upper, lower, and middle parts of the block body 105 are respectively formed with depressions. The first positioning part 101, the second positioning part 102, and the third positioning part 103 are used for installing the live wire conductive sheet 30 on the first positioning part 101, the neutral wire conductive sheet 40 on the second positioning part 102, and the ground wire conductive sheet 50 on the third positioning part 103, respectively. In addition, the upper and lower sides of the substrate 104 are also integrally formed with a plurality of ear parts with fastening holes 106 in the horizontal direction.

The live wire conductive sheet 30 and the neutral wire conductive sheet 40 have substantially the same structure, and are respectively arranged on the first positioning part 101 and the second positioning part 102 of the positioning seat 10. Wherein, the live wire conductive sheet 30 is formed integrally with a conductive metal sheet to have a first live wire extension part 301, a second live wire extension part 302, and a third live wire extension part 303 respectively extending a length. The first live wire extension part 301 and the second live wire extension part 302 extend in opposite directions and parallel to each other, the extension direction of the third live wire extension part 303 is perpendicular and connected to the extension directions of the first live wire extension part 301 and the second live wire extension part 302. The opposite sides of the end of the live wire extension part 301 are respectively bent to form a first live wire bending part 3012 to form a trumpet-shaped first live wire mouth 3011, and the opposite sides of the end of the second live wire extension part 302 are respectively bent to form a second live wire bending part 3022 to form a trumpet-shaped second live wire mouth 3021, and the opposite sides of the end of the third live wire extension part 303 are respectively bent to form a third live wire bending part 3032 to form a trumpet-shaped third live wire mouth 3031.

The neutral wire conductive sheet 40 is integrally formed with a conductive metal sheet to have a first neutral wire extension part 401, a second neutral wire extension part 402 and a third neutral wire extension part 403 extending a length respectively. The neutral wire extension part 401 and the second neutral wire extension part 402 extend in opposite directions and parallel to each other, and the extension direction of the third neutral wire extension part 403 is perpendicular and connected to the first neutral wire extension part 401 and the second neutral wire extension part 402. The opposite sides of the end of the first neutral wire extension part 401 are respectively bent to form a first neutral wire bending part 4012 to form a trumpet-shaped first neutral wire mouth 4011, the opposite sides of the end of the second neutral wire extension part 402 are respectively bent to form a second neutral wire bending part 4022 to form a trumpet-shaped second neutral wire mouth 4021, and the opposite sides of the end of the third neutral wire extension part 403 are respectively bent to form a third neutral wire bending part 4032 to form a trumpet-shaped third neutral wire mouth 4031.

The ground wire conductive sheet 50 is integrally formed with a conductive metal sheet to have a first ground wire extension part 501, a second ground wire extension part 502, and a third ground wire extension part 503 extending a length respectively. The ground wire extension part 501 and the second ground wire extension part 502 extend in opposite directions to and parallel to each other. The extension direction of the third ground wire extension part 503 is perpendicular and connected to the first ground wire extension part 501 and the second ground wire extension part 502. The opposite sides of the end of the first ground wire extension part 501 are respectively bent to form a first ground wire bending part 4012 to form a symmetrical S-shaped first ground wire mouth 5011, the opposite sides of the end of the second ground wire extension part 502 are respectively bent to form a second ground wire bending part 5022 to form a symmetrical S-shaped second ground wire mouth 5021, and the opposite sides of the end of the third ground wire extension part 503 are respectively bent to form a third ground wire bending part 5032 to form a symmetrical S-shaped third ground wire mouth 5031.

Figure 2:
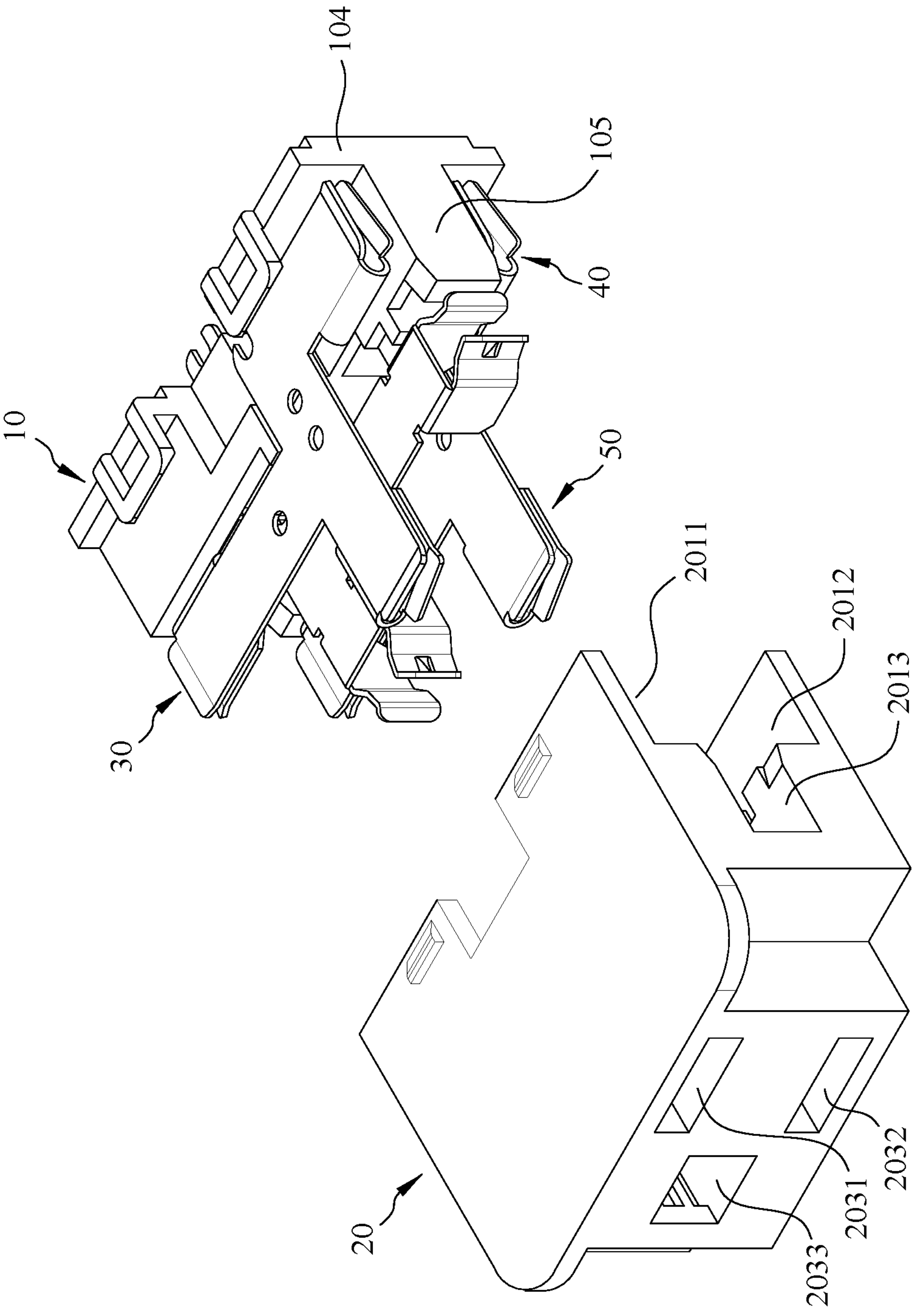
FIG. 2 is an exploded view showing the structure of the socket module of the present invention after removing the fixing seat.

The live wire conductive sheet 30, the neutral wire conductive sheet 40, and the ground wire conductive sheet 50 are installed to the first positioning part 101, the second positioning part 102 and the third positioning part 103 of the positioning seat 10 respectively, as shown in FIG. 2. In this state, the first live wire mouth 3011, the first neutral wire mouth 4011 and the first ground wire mouth 5011 are all parallel to each other facing the first direction; the second live wire mouth 3021, the second neutral wire mouth 4021 and the second ground wire mouth 5021 are parallel to each other and face the second direction; the third live wire mouth 3031, the third neutral wire mouth 4031 and the third ground wire mouth 5031 are all parallel to each other and face the third direction.

The fixing seat 20 is used to accommodate the positioning seat 10, the live wire conductive sheet 30, the neutral wire conductive sheet 40, and the ground wire conductive sheet 50. The fixing seat 20 has a first wall 201, a second wall 202, and a third wall 203, wherein the first wall 201 and the second wall 202 are parallel to each other, and the third wall 203 vertically connects the first wall 201 and the second wall 202. The first wall 201 is formed with a first live wire slot hole 2011 corresponding to the first live wire mouth 3011, a first neutral wire slot hole 2012 corresponding to the first neutral wire mouth 4011, and a first ground wire slot hole 2013 corresponding to the first ground wire mouth 5011. The second wall 202 is formed with a second live wire slot hole 2021 corresponding to the second live wire mouth 3021, a second neutral wire slot hole 2022 corresponding to the second neutral wire mouth 4021, and a second ground wire slot hole 2023 corresponding to the second ground wire mouth 5021. The third wall 203 is formed with a third live wire slot hole 2031 corresponding to the third live wire mouth 3031, the third neutral wire slot hole 2032 corresponding to the third neutral wire mouth 4031, and the third ground wire slot hole 2033 corresponding to the third wire mouth 5031. In addition, the fixing seat 20 also forms an upper plate 204A and a lower plate 204B on two symmetrical opposite sides, and a plurality of protruding hook parts 205 are respectively formed on the surfaces of the upper plate 204A and the lower plate 204B.

As such, after the live wire conductive sheet 30, the neutral wire conductive sheet 40, and the ground wire conductive sheet 50 are all installed on the positioning seat 10, and then the entirety is installed together in the fixing seat 20, so that the block body 105 enters a part of the first ground wire slot hole 2013, and make the hook part 205 and the fastening hole 106 fasten and fix together. As such, the positioning seat 10 cannot be separated from the fixing seat 20, thereby forming a socket module that can be connected to three plugs at the same time, as shown in the FIGS. 5-8.

Figure 9:
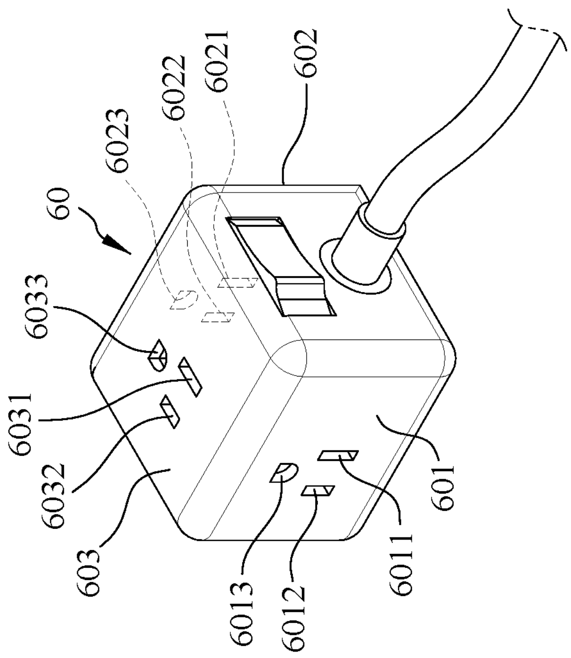
FIG. 9 is a perspective view showing an embodiment of the socket module of the present invention after assembling the socket housing.

The socket module of the present invention is then installed into a socket housing 60 to form a complete socket, such as an extension cord socket. For example, the socket housing 60 shown in FIG. 9 is rectangular and has four surrounding walls, wherein the first housing wall 601 has a first live wire slot 6011, a first neutral wire slot 6012, and a first ground wire slot 6013, the second housing wall 602 has a second live wire slot 6021, a second neutral wire slot 6022, and a second ground wire slot 6023, and the third housing wall 603 has a third live wire slot 6031, a third neutral wire slots 6032, and third ground wire slots 6033. When the aforementioned socket module is installed inside the socket housing 60, the first live wire slot hole 2011, the first neutral wire slot hole 2012 and the first ground wire slot hole 2013 respectively correspond to the first live wire slot 6011, the first neutral wire slot 6012 and the first ground wire slot 6013; the second live wire slot hole 2021, the second neutral wire slot hole 2022 and the second ground wire slot hole 2023 correspond to the second live wire slot 6021, the second neutral wire slot 6022 and the second ground wire slot 6023 respectively; and the third live wire slot hole 2031, the third neutral wire slot hole 2032 and the third ground wire slot hole 2033 correspond to the third live wire slot 6031, the third neutral wire slot 6032 and the third ground wire slot 6033 respectively. Thereby, the socket housing 60 can be configured with sockets for three plug connections facing three directions, so that the overall socket has the function of multiple sockets in a small size, and the structure and volume are more compact.

Figure 10:
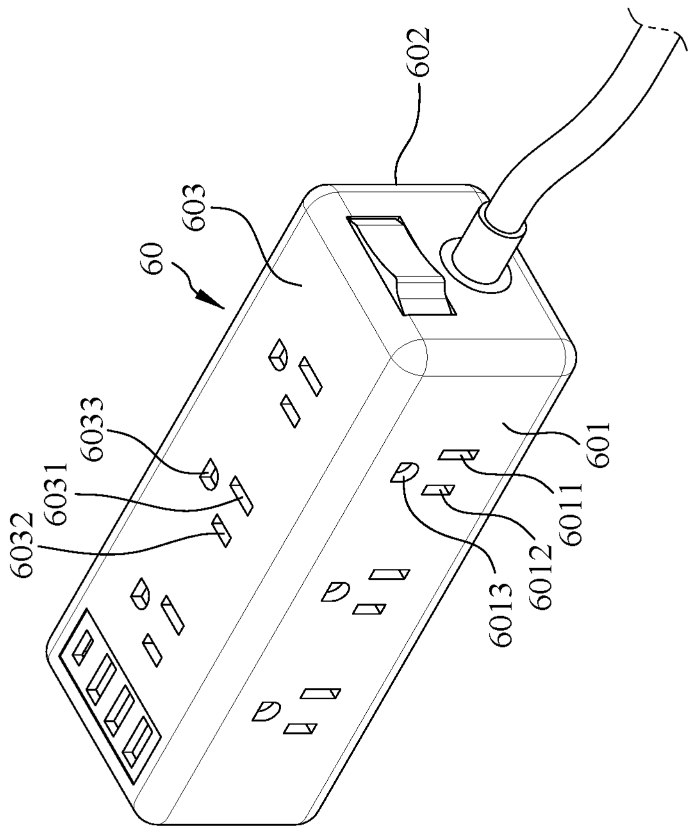
FIG. 10 is a perspective view of an embodiment showing that the socket module of the present invention is assembled in a socket housing with multiple sets of sockets on each housing wall.

In another embodiment, as shown in FIG. 10, a plurality of first live wire slots 6011, first neutral wire slots 6012 and first ground wire slots 6013 can be set on the first housing wall 601 of the socket housing 60. The second housing wall 602 is provided with a plurality of second live wire slots 6021, the second neutral wire slot 6022 and the second ground wire slot 6023. The third housing wall 603 is provided with a plurality of third live wire slots 6031, the second three neutral wire slots 6032 and a third ground wire slot 6033. Therefore, a plurality of the aforementioned socket modules are correspondingly installed inside the socket housing 60 to form a socket with more slots.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A socket module, comprising:

a positioning seat, having a first positioning part and a second positioning part respectively located at symmetrical positions, and a third positioning part located between the first positioning part and the second positioning part;

a live wire conductive sheet, arranged on the first positioning part, and the live wire conductive sheet having a first live wire extension part, a second live wire extension part, and a third live wire extension part respectively extending a length, wherein the first live wire extension part and the second live wire extending part extending towards opposite direction and parallel to each other, the third live wire extending part extending perpendicularly and connected to the first live wire extending part and the second live wire extending part, and a first live wire mouth, a second live wire mouth, and a third live wire mouth being respectively formed at the ends of the first live wire extension part, the second live wire extension part, and the third live wire extension part;

a neutral wire conductive sheet, arranged on the second positioning part, the neutral wire conductive sheet having a first neutral wire extension part, a second neutral wire extension part, and a third neutral wire extension part respectively extending a length, wherein the first neutral wire extension part and the second neutral wire extension part extending towards directions opposite and parallel to each other, the third neutral wire extension part extending perpendicularly and connected to the first neutral wire extension part and the second neutral wire extension part, and a first neutral wire mouth, a second neutral wire mouth, and the third neutral wire mouth being respectively formed at the ends of the first neutral wire extending part, the second neutral wire extension part, and the third neutral wire extension part;

a ground wire conductive sheet, arranged on the third positioning part, the ground wire conductive sheet having a first ground wire extension part, a second ground wire extension part, and a third ground wire extension part respectively extending a length, wherein the first ground wire extension part and the second ground wire extension part extending towards directions opposite and parallel to each other, the third ground wire extension extending perpendicularly and connected to the first ground wire extension part and the second ground wire extension part, and a first ground wire mouth, a second ground wire mouth, and a third ground wire mouth being respectively formed at the ends of the first ground wire extension part, the second ground wire extension part, and the third ground wire extension part; and a fixing seat for accommodating the positioning seat, the live wire conductive sheet, the neutral wire conductive sheet, and the ground wire conductive sheet, and having a first wall, a second wall, and a third wall, wherein the first wall having a first live wire slot hole corresponding to the first live wire mouth, a first neutral wire slot hole corresponding to the first neutral wire mouth, and a first ground wire slot hole corresponding to the first ground wire mouth, the second wall having a second live wire slot hole corresponding to the second live wire mouth, a second neutral wire slot hole corresponding to the second neutral wire mouth, and a second ground wire slot hole corresponding to the second ground wire mouth, the third wall having a third live wire slot hole corresponding to the third live wire mouth, a third neutral wire slot hole corresponding to the third neutral wire mouth, and a third ground wire slot hole corresponding to the third ground wire mouth.

2. The socket module according to claim 1, wherein the first wall and the third wall are parallel to each other, the second wall is adjacent to the first wall and the third wall, and is perpendicular to the first wall and the third wall.

3. The socket module according to claim 2, wherein the live wire conductive sheet and the neutral wire conductive sheet have the same structure.

4. The socket module according to claim 3, wherein the first live wire mouth, the second live wire mouth, the third live wire mouth, the first neutral wire mouth, the second neutral wire mouth, and the third neutral wire mouth are trumpet-shaped openings respectively formed by bending the opposite sides thereof.

5. The socket module according to claim 4, wherein the first ground wire mouth, the second ground wire mouth, and the third ground wire mouth are openings formed by bending to form mutually symmetrical S shapes on the opposite sides thereof.

6. The socket module according to claim 1, further comprising:

a socket housing having a first housing wall, a second housing wall, and a third housing wall, the first housing wall having a first live wire slot, a first neutral wire slot, and a first ground wire slot, the second wall having a second live wire slot, a second neutral wire slot, and a second ground wire slot, the third wall having a third live wire slot, a second neutral wire slot, and a third ground wire slot;

wherein, when the positioning seat being assembled in the fixing seat, the first live wire slot hole, the first neutral wire slot hole, and the first ground wire slot hole being respectively corresponding to the first live wire slot, the first neutral wire slot, and the first ground wire slot, the second live wire slot hole, the second neutral wire slot hole, and the second ground wire slot hole being respectively corresponding to the second live wire slot, the second neutral wire slot, and the second ground wire slot, and the third live wire slot hole, the third neutral wire slot hole, and the third ground wire slot hole being respectively corresponding to the third live wire slot, the third neutral wire slot, and the third ground wire slot.

7. The socket module according to claim 6, wherein a plurality of socket modules are integrated and arranged in sequence into the socket housing, and the first housing wall has a plurality of the first live wire slots, the first neutral wire slots, and the first ground wire slots, the second housing wall has a plurality of the second live wire slots, the second neutral wire slots, and the second ground wire slots, and the third housing wall has a plurality of the third live wire slots, the third neutral wire slots, and the third ground wire slots.

8. The socket module according to claim 1, wherein the first live wire extension part, the second live wire extension part, and the third live wire extension part are integrally formed to form the live wire conductive sheet, the first neutral wire extension par, the second neutral wire extension part, and the third neutral wire extension part are integrally formed to form the neutral wire conductive sheet, and the first ground wire extension part, the second ground wire extension part, and the third ground wire extension part are integrally formed to form the ground conductive sheet.

* * * * *